(12) United States Patent
Kashiwase et al.

(10) Patent No.: US 7,142,034 B2
(45) Date of Patent: Nov. 28, 2006

(54) CHARGE SIGNAL CONVERTING AMPLIFIER

(75) Inventors: Hajime Kashiwase, Tokyo (JP); Hiromichi Watanabe, Tokyo (JP); Hiroshi Yokoyama, Saitama (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/943,569

(22) Filed: Sep. 17, 2004

(65) Prior Publication Data

US 2005/0062514 A1 Mar. 24, 2005

(30) Foreign Application Priority Data

Sep. 18, 2003 (JP) ............................. 2003-326821

(51) Int. Cl.
*H03L 5/00* (2006.01)
(52) U.S. Cl. .......................................... 327/307; 330/9
(58) Field of Classification Search ................ 327/307; 330/9
See application file for complete search history.

(56) References Cited

U.S. PATENT DOCUMENTS

| | | | | |
|---|---|---|---|---|
| 4,596,956 A | * | 6/1986 | Gardner | ........................ 330/9 |
| 4,760,345 A | * | 7/1988 | Busser et al. | ................... 330/9 |
| 4,806,875 A | * | 2/1989 | Schaffer | ........................ 330/9 |
| 5,563,587 A | * | 10/1996 | Harjani | .................... 340/870.3 |
| 6,426,663 B1 | * | 7/2002 | Manlove et al. | ............ 327/307 |
| 6,952,130 B1 | * | 10/2005 | Kuyel et al. | ................... 330/9 |

FOREIGN PATENT DOCUMENTS

JP 3123798 B2 7/1993

* cited by examiner

*Primary Examiner*—Kenneth B. Wells
(74) *Attorney, Agent, or Firm*—Darby & Darby

(57) ABSTRACT

Positive charges of a sensor element are stored in a capacitor for converting a voltage, are converted into a positive voltage by an amplifier, and then are outputted. When the polarity of the charges of the sensor element are inverted to be negative, the charges inversely flow from the capacitor for converting the voltage and feed back to an equivalent capacitor of the sensor element. The output of the amplifier reduces and returns to a zero-point. An automatic correcting circuit makes an FET conductive and the charges are discharged in order to prevent the fluctuation of the zero-point level due to the negative drift.

8 Claims, 9 Drawing Sheets

PRIOR ART

CHARGE SIGNAL CONVERTING AMPLIFIER

CROSS-REFERENCE TO RELATED APPLICATIONS

The present application claims priority, under 35 U.S.C. § 119(e) to Japanese Patent Application No. 2003-326821, filed on Sep. 18, 2003, which is hereby incorporated by reference in its entirety.

BACKGROUND OF THE INVENTION

1. Field of the Invention

The present invention relates to a charge signal converting amplifier which converts a charge signal outputted from a charge generating sensor into a voltage.

2. Description of the Related Art

A charge generating sensor such as a piezoelectric element generates a charge in proportion to a load magnitude which is mechanically applied. Generally, the charge generating sensor is suitable for measuring a continuous dynamic pressure, and is used as a pressure sensor (cylinder pressure sensor) for measuring a combustion pressure in a cylinder. In order to extract a signal from the charge generating sensor, the signal from the charge generating sensor is generally converted into a voltage signal by using an amplifier with an ultra-high input impedance. Referring to FIG. 8, the charge signal converting amplifier (so-called "a charge amplifier") has a feedback capacitor C between an input and an output of an amplifier AO having an infinite gain with an opposite phase (reverse phase). The charge amplifier is frequency used.

However, the measurement with the charge generating sensor always has a zero point drifting problem due to a charge leakage or a temperature change. For example, upon measuring the pressure by connecting the charge signal converting amplifier to a pressure sensor such as the piezoelectric element, the pressure increases from a zero level and returns thereto. Then, the zero level outputted from the charge signal converting amplifier drifts in the negative direction because the charges of the pressure sensor become negative in accordance with the charge leakages, or drift and fluctuate in the positive direction due to the temperature increase. This impedes the accurate measurement.

A description is given about examples of level fluctuations of zero points due to the charge leakages or temperature changes when the charge amplifier is connected to the cylinder pressure sensor comprising the piezoelectric element attached to a combustion chamber of the engine for measuring a combustion pressure in the cylinder.

In a normal engine having a four-stroke cycle (intake compression—combustion—exhaust), a piston reaches nearly a top dead center (TDC) position. Then, an exhaust valve is closed, and an intake valve is opened. In the case of a natural aspiration engine, the cylinder pressure becomes the atmospheric pressure. In the case of an engine with a supercharger, the pressure becomes a pressure obtained by adding a boost pressure (e.g., 500 mmHg to 1,500 mmHg) to the atmospheric pressure.

Then, the piezoelectric effect of the sensor element generates a charge proportional to a cylinder pressure load. The generated charge in this case is designated by a reference symbol −q. The charge −q is charged by the feedback capacitor C of the charge amplifier, and it is converted into a voltage signal +V by the amplifier A0, and the converted signal is outputted. Therefore, the signal level is at the zero level when the cylinder pressure becomes the atmospheric pressure. When the boost pressure exists, the signal level is at the level obtained by adding the boost pressure as a DC voltage component to the zero level of the atmospheric pressure. Then, the signal level becomes a basic level of a combustion waveform which rises by the combustion pressure to be generated later.

During the period when the piston moves from the TDC position to a bottom dead center (BDC) position, the intake continues in the meantime and, the cylinder pressure is not highly changed and is maintained to approximately the basic level. Next, the piston approximately reaches the BDC position, and the intake valve is closed. Then, the compression starts for a period from the BDC to the TDC. Simultaneously with the compression start, the cylinder pressure starts to increase, the charges of the piezoelectric element increase and are sequentially charged by the feedback capacitor C of the charge amplifier. Further, the voltage signal +V, which is converted and outputted by the amplifier AO, increases.

As a result of an ignition just before the piston reaches the TDC position (i.e., just before the maximum level of the compression pressure), the combustion pressure is generated and the generation of the combustion pressure rapidly increases the charges of the piezoelectric element. Further, the voltage signal +V, which is converted and outputted by the amplifier AO, also rapidly increases. Then, a signal outputted as the combustion pressure is the signal at the above-mentioned basic level. That is, the combustion pressure is the signal at the atmospheric pressure level in the case of the natural aspiration engine, while it is the signal at the level obtained by superimposing (or overlapping) the signal to the DC voltage component of the boost pressure in the case of the supercharged engine.

Next, after the cylinder pressure becomes a maximum, the piston moves from the TDC position to the BDC position. Accordingly, the cylinder pressure decreases. Then, the charges are inverted in their polarity, and the feedback to the piezoelectric element starts. That is, with respect to the piezoelectric element, it seems that the combustion pressure acts as a positive stress (compression force) and then the charges with the polarity of −q are charged in proportion to the stress. Further, when the combustion pressure decreases, it acts as a negative stress (tension) to the piezoelectric element, and then the polarity of the charges is inverted to +q in proportion to the stress. This phenomenon inverts the polarity of the feedback capacitor C and consequently inverts the polarity of the output signal.

After that, the piston approximately reaches the BDC position, and the exhaust valve is opened (the intake valve is still closed). Then the combustion gas is exhausted while the piston approaches the TDC position. Then, in the case of the natrual aspiration engine, the cylinder pressure of the natural aspiration engine returns to the atmospheric pressure. In the case of the supercharge engine, the cylinder pressure of the supercharged engine returns to the boost pressure. After one combustion cycle ends, the signal levels return to the level before starting the combustion cycle.

An ordinate in an oscillograph denotes the signal voltage and an abscissa denotes a rotational angle of the crankshaft or a period of time. Then, the oscillograph draws the change in the cylinder pressure during one cycle, namely, the combustion waveform is drawn. In the case of the natural aspiration engine, the combustion waveform rises from the atmospheric pressure (signal level), then, simultaneously to the combustion end, and it returns to the original signal level. In the case of the supercharged engine, the signal level rises from the boost pressure level (DC voltage level), then, simultaneously to the end of the combustion, and it returns to the original boost pressure level.

However, in the actual electric circuit comprising the sensor and the amplifier which are connected thereto, the insulation resistance is not actually infinite. Therefore the charges are leaked at each cycle in a combustion cycle having rapid repetitions such as the engine combustion, and the leaked charges are converted into the negative signal voltage. Further, upon measuring the engine combustion pressure, the pressure is measured under the circumstances of having a rapid temperature change and therefore the temperature change is superposed as the output. It seems that the pressure signal is placed on the DC current. Thus, referring to FIG. 9, a drift DV of the signal level is generated for an effective combustion pressure ECP, resulting in the offset of the waveform rising point.

Among waveform data including the above-mentioned offset of the signal level, the combustion waveform in one cycle is picked up and processed from the continuous combustion waveforms under the circumstances using a high speed and large capacity calculating apparatus in the research and development stages. The combustion waveform on the atmospheric pressure or the absolute pressure is estimated and the waveform may be analyzed. However, there are problems to be solved for application to mass production vehicles.

That is, in order to provide a system for measuring the engine combustion pressure and the combustion waveform for mass production vehicles, an offset value is calculated by an on-board device and the signal level needs to be obtained for the drift of the generated signal level. Consequently, a numerous processing capacity must be added to the on-board device, and the device increases in size and the costs increase.

As means for solving the above-mentioned problems, Japanese Patent Application No. 3123798 suggests a technology for substantially maintaining the zero level by connecting a filter having a threshold of 0.01 to 1.0 Hz to the output terminal of the charge signal converting amplifier, and by removing low frequency components of the pressure waveform. However, according to the suggested technology, the low frequency components of the combustion waveform are removed by a high pass filter and therefore the suggested technology uses substantially an AC coupling. As a result, the entire DC components of the waveform are removed. In order to achieve an accurate waveform analysis, a correction needs to compensate for the removed DC components, and thus, the calculating load necessary for the signal processing is not reduced.

SUMMARY OF THE INVENTION

Accordingly, it is an object of the present invention to provide a charge signal converting amplifier which prevents fluctuations of zero levels upon converting a charge signal outputted from a charge generating sensor into a voltage, which reduces calculating loads necessary for a signal processing.

Briefly, in the charge signal converting amplifier according to the present invention, upon converting the charge signal from the sensor for generating the charges by operations of a detected target into a voltage signal and outputting a converted signal, it is possible to automatically correct both a drift in a negative direction due to charge leakages generated in a signal transmitting system and the drift in a positive direction due to a temperature change and to set an output level of a signal converting circuit to the same level upon starting and ending a charge generation.

DESCRIPTION OF THE PREFERRED EMBODIMENTS

Figure 1:
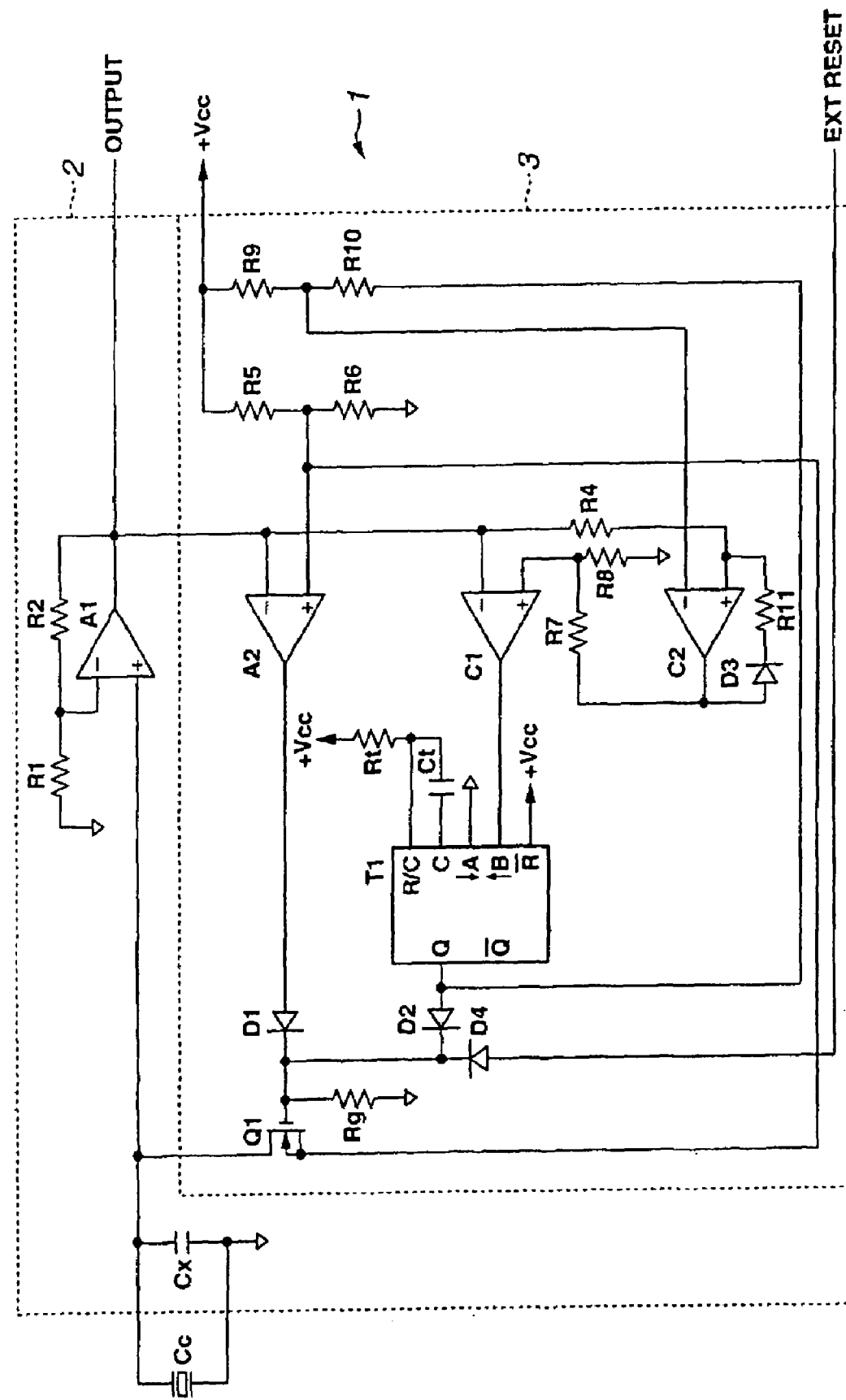
FIG. 1 is a circuit diagram showing a charge signal converting amplifier to which a charge generating sensor is connected.

A charge signal converting amplifier according to the present invention can respond to positive and negative polarities of input charges. Further, the charge signal converting amplifier can respond to either one of an inverting amplifier or a normal (non-inverting) amplifier. FIG. 1 shows a basic equivalent circuit of the normal amplifying for inputting the positive charges. Referring to FIG. 1, a reference symbol Cc denotes an equivalent capacitor indicating the generated charges of a charge generating sensor such as a pressure sensor using a piezoelectric element. Reference symbol 1 denotes the charge signal converting amplifier which receives an input from the equivalent capacitor Cc.

The charge signal converting amplifier 1 comprises a signal converting circuit 2, which converts a charge signal into a voltage signal, and an automatic correcting circuit 3, which automatically corrects positive and negative drifts at a zero point due to charge leakages or temperature change. The signal converting circuit 2 has a similar structure to the conventional charge signal converting amplifier, and mainly comprises a capacitor Cx for converting a voltage which stores generated charges of the charge generating sensor, and an amplifier A1 which amplifies and outputs the voltage of the capacitor Cx for converting the voltage. The automatic correcting circuit 3 mainly comprises an amplifier A2; comparators C1 and C2; a timer T1; and a switch element Q1.

The switch element Q1 can be a semiconductor switch or a relay switch. According to the first embodiment, the semiconductor switch is an FET (N-channel MOSFET in FIG. 1). Hereinafter, the switch element Q1 will be described as the FET Q1.

The capacitor Cx for converting the voltage is connected to the equivalent capacitor Cc of the charge generating sensor, and the voltage of the charges stored in the capacitor Cx is inputted and connected to a non-inverting terminal of the amplifier A1. An output terminal of the amplifier A1 is branched into three branches: a first branched terminal which is externally extended as an amplifier output; a second branched terminal which is connected to an inverting input terminal of the amplifier A1 via a resistor R2 and is grounded via a resistor R1; and a third branched terminal which is connected to the inverting input terminal of the amplifier A2, connected to the inverting input terminal of the comparator C1, and also connected to a non-inverting input terminal of a comparator C2 via a resistor R4.

The amplifier A2 is an inverting amplifier which detects a negative drift of a sensor output. A reference voltage Vref (e.g., +2 mV) is generated by dividing a circuit voltage Vcc (e.g., +DC 5V) by resistors R5 and R6, and is applied to the non-inverting input terminal. The reference voltage Vref is the voltage which determines a zero point in a single power-operation. The amplifier A2 sets the reference voltage Vref to the zero point, sets a voltage lower than the reference voltage Vref as the negative, and sets a voltage higher than the reference voltage Vref as the positive.

The comparators C1 and C2 correct the drift on a positive side of the sensor output. A first comparative voltage Vr1 is obtained by dividing an output of the comparator C2 by resistors R7 and R8 and is applied to the non-inverting input terminal of the comparator C1. A second comparative voltage Vr2 is obtained by dividing the circuit voltage Vcc with resistors R9 and R10 and is applied to the inverting input terminal of the comparator C2. The circuit voltage Vcc is connected through resistors R9 and R10 to an output (output Q) terminal of a timer T1. An output terminal of the comparator C1 is connected to a trigger input (input B) terminal of the timer T1. An output terminal of the comparator C2 is connected to a non-inverting input terminal of the comparator C1 via the resistor R7. Further, the output terminal of the comparator C2 is also connected to a non-inverting input terminal of the comparator C2 via a forward diode D3 and a resistor R11.

The timer T1 is triggered by a rising edge on the output of the comparator C1, and outputs a one-shot pulse with a pulse width determined in dependency on a capacitor Ct and an external resistor Rt. The output Q terminal of the timer T1 and an output terminal of the amplifier A2 are connected to a gate of the FET Q1 via an OR circuit comprising diodes D1 and D2.

The gate of the FET Q1 is grounded via a gate resistor Rg.

The drain of the FET Q1 is connected to the capacitor Cx for converting the voltage and the non-inverting input terminal of the amplifier A1. The source of the FET Q1 is connected to an electric potential point for applying a reference voltage to the resistors R5 and R6. The gate of the FET Q1 receives an external reset signal via a diode D4 for switching on the FET Q1 if necessary and for discharging the charges on the input terminal of the amplifier A1.

As mentioned above, according to the present invention, the charge signal converting amplifier 1 can have various circuit structures for inverting the input of the positive and negative charges, and the like, by combining the positive or negative input charge, by inverting or not inverting the amplifier, and by using the switch element Q1. The structures of the amplifiers A1 and A2 for inverting the input of the positive charge, the converting of the input of the negative charge, the inverting of the input of the negative charge, and the like are disclosed in Japanese Patent Application No. 2003-76130 filed by the present applicant. In this case, in accordance with the output system of the amplifiers A1 and A2, the connection of the comparators C1 and C2 and the timer T1 may be changed.

With the above-described structure, the mechanical load is applied to the sensor element of the charge generating sensor, thereby generating the charges with the polarity of +q (positive) that is directly proportional to the magnitude of the mechanical load. The capacitor Cx for converting the voltage of the signal converting circuit 2 is charged by the equivalent capacitor Cc of the charge generating sensor, and the amplifier A1 converts the charges into the positive voltage and outputs the voltage. When the mechanical load of the sensor element decreases, the polarity of the charges is inverted to the polarity of –q (negative), and the charges flow back from the capacitor Cx and are fed back to the capacitor Cc.

In this case, the following formula (1) gives a value which is obtained by converting an output voltage V0 of the amplifier A1, namely, the charge q generated by the charge generating sensor. Here, a reference symbol Cs denotes the equivalent stray (or floating) capacitance of the signal transmitting system such as a signal line between the capacitor Cx and an input pin of the amplifier A1 or a coaxial cable for connecting the charge generating sensor and the capacitor Cx. The reference symbol Cds denotes a capacitance between the drain and the source of the FET Q1. A reference symbol Cdg denotes the capacitance between the drain and the gate of the FET Q1.

$$V0=(1+R2/R1)q/(Cc+Cs+Cx+Cds+Cdg) \quad (1)$$

This phenomenon is observed by the output of the amplifier A1. The voltage before applying the mechanical load to the sensor element is zero. When the mechanical load is applied, the voltage changes to a positive voltage. When the mechanical load starts to decrease, the voltage changes to a negative voltage. Therefore, the charges are zero without the charge leakages, and the output voltage of the amplifier A1 is zero.

However, there is a finite insulation resistance in the signal transmitting system such as the signal line between the capacitor Cx for converting the voltage and the input pin of the amplifier A1 or the coaxial cable for connecting the sensor element and the capacitor Cx for converting the voltage. A portion of the charges in the capacitor Cx is leaked, the mechanical load starts to decrease, and then the charges are superposed (or overlapped) on the signal voltage to be switched to the negative voltage and are outputted. That is, when the signal voltage, which is to be returned to the initial level upon starting the mechanical load, reaches the negative area, the zero point of the signal outputted from the amplifier A1 drifts in the negative direction, and an accurate measurement of the signal cannot be performed.

The cylinder combustion pressure in the engine is measured using the pressure sensor (including the piezoelectric element) by connecting the charge signal converting amplifier to the charge generating sensor under large temperature change conditions. Then, the positive drift, to which the temperature increase is superposed as the output, is generated because of the measurement under extreme temperature change conditions, and the pressure signal is placed on the DC current.

The drift in the negative direction at the zero point due to the charge leakages and the drift in the positive direction at the zero point due to the temperature change are corrected by the automatic correcting circuit 3. The output level (zero-point level) of the signal converting circuit 2 maintains the same level upon starting and ending the generation of the charges in the sensor element. A description for the case of measuring the pressure by the pressure sensor including the piezoelectric element and of the operation of the automatic correcting circuit 3 is given below.

First, a description is given of the automatic correction of the negative drift due to the charge leakages. In order to shorten the explanation, the resistors R1 and R2, for setting the gain of the amplifier A1, are set to be infinite and be short-circuited (0Ω), respectively. Thus, the gain of the amplifier A1 is 1 and the charges generated by the sensor become a low voltage which are inputted into the amplifier A1 via the capacitor Cx. The amplifier A1 operates as a buffer amplifier for obtaining the voltage.

The positive pressure is applied to the sensor, and the positive charges are generated. Then, the amplifier A1 of the signal converting circuit 2 outputs the positive voltage. On the other hand, if the charges are leaked and are returned to zero, or there is the negative pressure, then the amplifier A1 outputs the negative signal. The amplifier A2 of the automatic correcting circuit 3 detects the negative output of the amplifier A1 as the charge leakages.

The amplifier A2 of the automatic correcting circuit 3 is an amplifier with the high gain (in the order of 100,000 to 1,000,000), inversely amplifies the negative voltage of the amplifier A1 in the signal converting circuit 2, and applies the amplified output to the gate of the FET Q1. When the gate voltage of the FET Q1 is less than the threshold voltage Vth (around 1 to 3 V), the charges are injected to the capacitor Cx for converting the voltage via the capacitance Cdg between the drain and the gate.

After that, if the gate voltage of the FET Q1 becomes greater than the threshold voltage Vth, the interval between the drain and the source starts to be conductive. Consequently, the charges of the sensor are discharged via the FET Q1 and the voltage at the output terminal of the amplifier A1 is the zero-point level (2 mV).

The automatic correction for the negative drift of the amplifier A2 and the FET Q1 is performed by a negative feedback circuit when the output is the negative, taken from the view of the amplifier A1. The automatic correction is performed by making the input of the amplifier A1 conductive at the zero point with the FET Q1. Then, the pressure increases and the lowest pressure (including the negative pressure) is set as the zero point and then the circuits operate. As long as the input of the amplifier A1 is within the negative area, this condition continues.

In the automatic correction, the positive voltage is applied to the gate of the FET Q1. When the pressure continuously does not change, the FET Q1 is balanced at a certain point and the balanced state is maintained. The balanced state is influenced from the gain or offset of the amplifiers A1 and A2 and from parameters such as the threshold voltage Vth of the FET Q1 and a mutual conductance gm. However, the output of the amplifier A1 is approximately zero.

That is, when the gate voltage of the FET Q1 decreases, the charges stored in the capacitance Cdg between the drain and the gate flow in the direction for reducing the input voltage of the amplifier A1. As a result, the charges flow so that the gate voltage increases via the amplifiers A1 and A2. On the other hand, when the gate voltage increases, the same operation functions (or starts). Therefore, as long as another voltage of the amplifier does not fluctuate, the same state maintains.

Causes for escaping from the balanced state are the two following ones of (A) and (B). When the causes (A) or (B) result in the departure from the balanced state, the automatic correcting circuit 3 stops the circuit correction.

(A) Pressure Increase

The input of the amplifier A1 increases, then, the output of the amplifier A1 rises, and the output of the amplifier A2 (gate voltage of the FET Q1) reduces. Further, the pressure increases, the output of the amplifier A2 becomes zero, and the correction of the automatic correcting circuit 3 ends. In this case, the charges stored in the capacitance Cdg between the drain and the gate of the FET Q1 are partly offset (or cancel each other) with the input, and the offset operation with the input continues until the gate voltage becomes the zero-point level. As a result, the output of the amplifier A1 is compressed at the rising timing of the input. The compression amount is determined based on the threshold voltage Vth and the capacitance Cdg between the drain and the gate. Therefore, a low Cdg between the drain and the gate is preferably used for the FET Q1 as the capacitance semiconductor switch.

(B) Charge Leakage

The charge leaks and then the charge is in the positive direction. Similarly, the output of the amplifier A1 increases and the output of the amplifier A2 decreases. As a result of the charge leakages, the balanced state is reset when the input reaches the positive area.

Next, a description is given of the automatic correction for the positive drift due to the temperature change. The automatic correction for the positive drift starts when the drift amount is slightly higher than the expected maximum drift amount when the pressure is over the peak and then falls. Specifically, the output of the amplifier A1 increases over the second comparative voltage Vr2 of the comparator C2. Then, it is over the peak and starts decreasing, and becomes lower than the first comparative voltage Vr1 of the comparator C1. Then, the FET Q1 is switched on, and the voltage at the output terminal of the amplifier A1 is the zero-point level (2 mV).

The second comparative voltage Vr2 of the comparator C2 is applied as the voltage obtained by dividing the circuit voltage Vcc by the resistors R9 and R10 when the timer T1 is not triggered (e.g., the output Q is at the low level). The voltage differs depending on the sensor. However, the voltage is set so that it is slightly higher than the maximum drift amount in the positive direction in the cycle in view of the noises. The comparator C2 compares the output of the amplifier A1 with the second comparative voltage Vr2. When the output of the amplifier A1 is higher than the second comparative voltage Vr2, the output of the comparator C2 is changed to the high level (+Vcc; 5V) from the low level (0V).

In this case, the output of the comparator C2 is partially fed back to the non-inverting input side thereof via the diode D3 and the resistor R11 and, consequently, the comparator C2 enters a holding state. Irrespective of the output of the amplifier A1, the output of the comparator C2 maintains the high level. In this state, the first comparative voltage Vr1 of the comparator C1 is set to the value which is obtained by dividing the output of the comparator C2 by the resistors R7 and R8 (Vr1=(5*R8)/(R7+R8)), which is lower than the second comparative voltage Vr2 set from the expected maximum drift amount in the positive direction.

The comparator C2 detects that the pressure is increasing, that the pressure is over the peak, and that the pressure is starting to decrease. Then, when the output of the amplifier A1 is lower than the first comparative voltage Vr1 of the comparator C1 during the fall of the pressure, the output Q of the comparator C1 becomes the high level (5V). As a consequence, the timer T1 is triggered at the rising edge of the output at the high level of the comparator C1.

The timer T1 is triggered and then a one-shot pulse is outputted with the pulse width determined by the external resistor Rt and the capacitor Ct. The pulse width of the one-shot pulse is approximately several hundreds of ns to several tens of μs, depending on the type of semiconductor element used. As the result of the pulse output from the timer T1 (output Q), a higher voltage than the threshold voltage Vth is applied to the gate of the FET Q1, and the circuit between the drain and the source in the FET Q1 is conductive. The charges are discharged irrespective of the input state of the sensor signal and the input of the amplifier A1 is at the zero-point level (2 mV). Simultaneously, the output Q of the timer T1 becomes the high level (5V) and thus the second comparative voltage Vr2 of the comparator C2 is 5V. The holding state of the comparator C2 is reset.

When the pulse signal of the timer T1 does not exist, the gate resistor Rg sets the gate voltage to zero in the FET Q1. Therefore, when the gate voltage is the threshold voltage Vth or less, the charges in the capacitance Cdg between the drain and the gate are transmitted to the capacitor Cx for converting the voltage and the input of the amplifier A1 is in the negative direction. The input voltage of the amplifier A1 is represented by the equation $[-V_{th}*C_{dg}/(C_s+C_x+C_{dg}+C_{ds})]$. The voltage is sufficient to operate the automatic correction for the negative drift. Irrespective of the input, the timing is set to the zero point and the circuits operate. When the pressure decreases, the automatic correction for the negative drift functions and the lowest pressure point is the zero point and the circuits operate.

Figure 2:
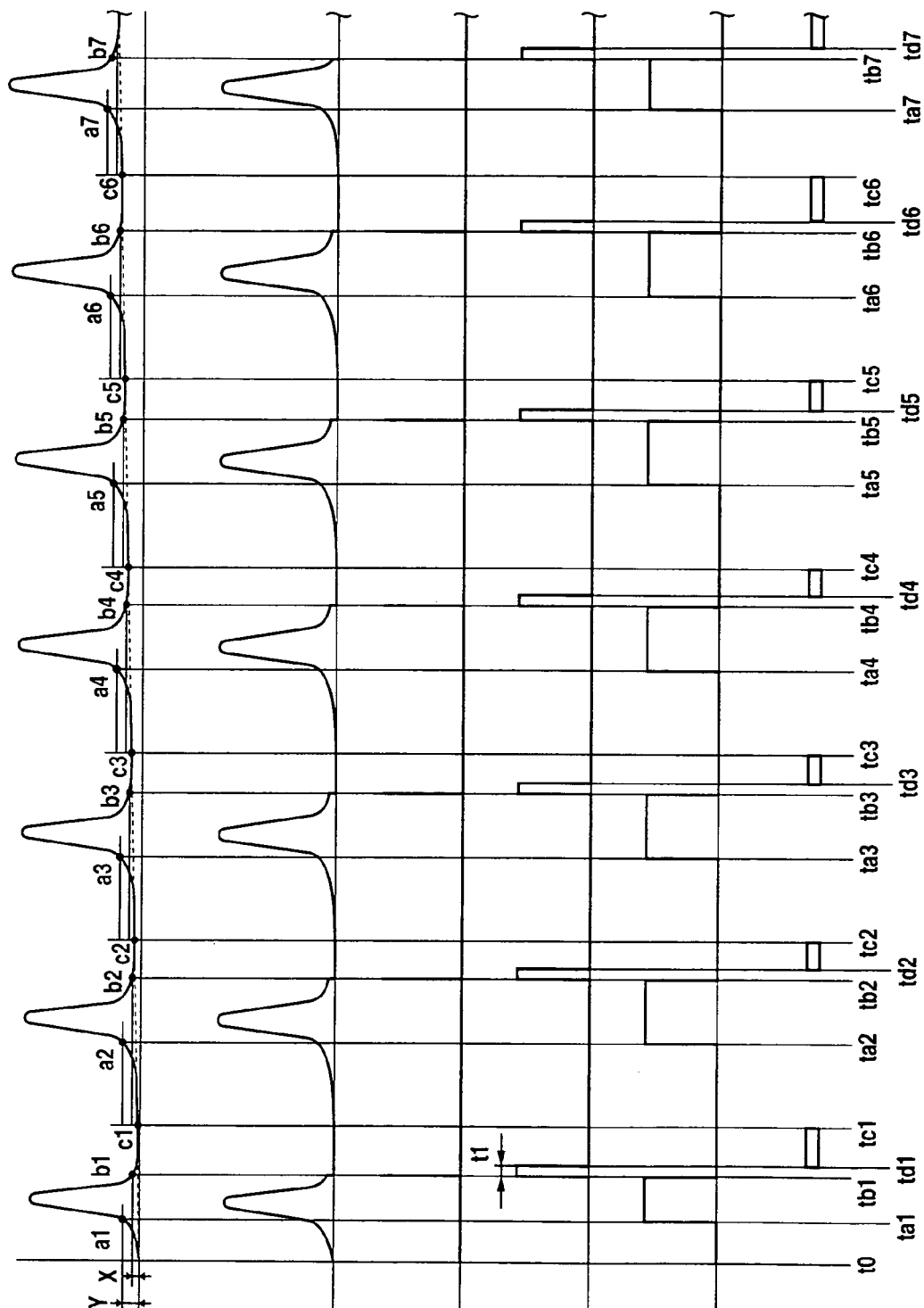
FIGS. 2A to 2F are time charts showing output timings of units for the sensor outputs upon rising a drift.
Figure 3:
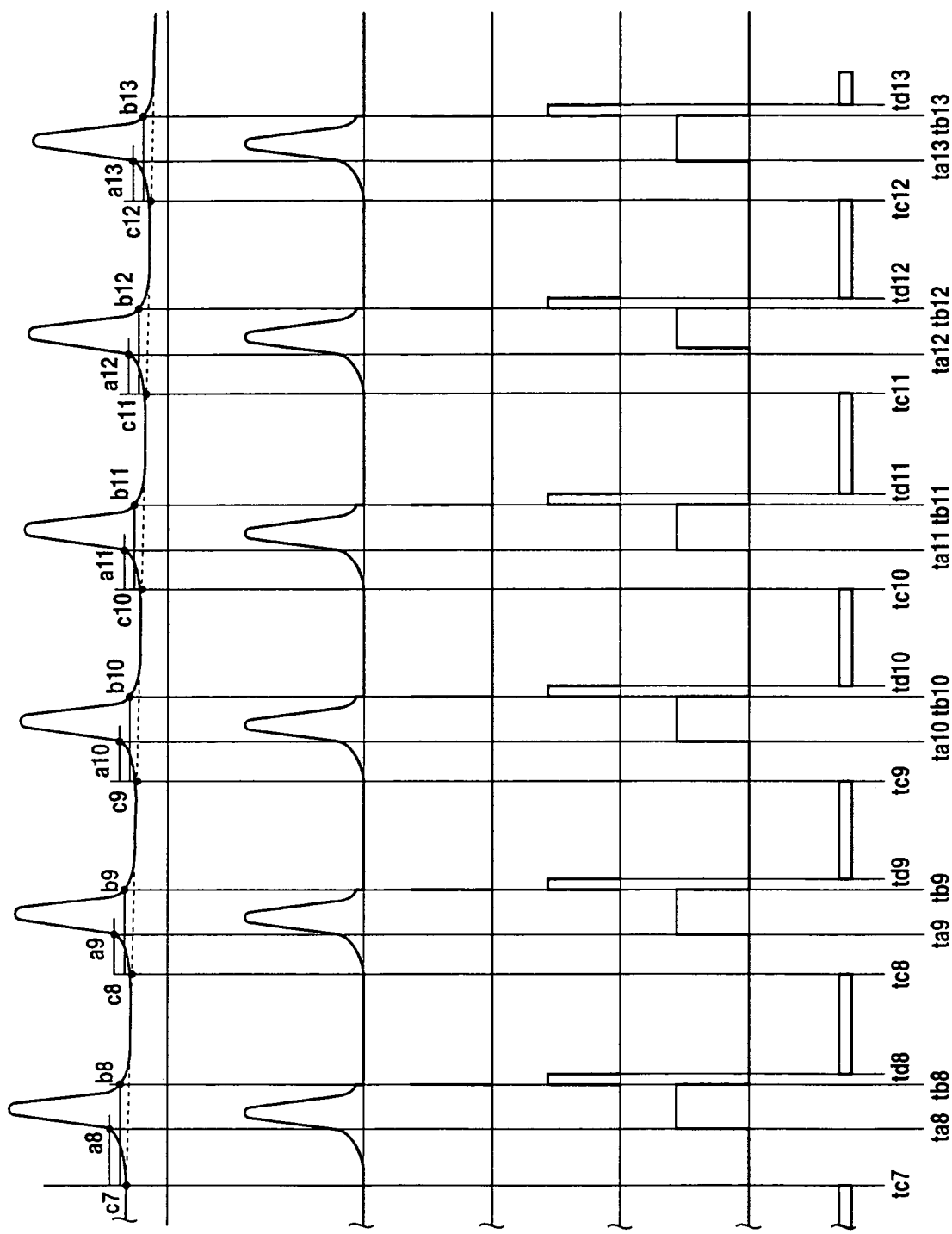
FIGS. 3A to 3F are the time charts showing the output timings of the units for the sensor outputs upon falling the drift.

The above operation will be described with reference to time charts shown in FIGS. 2A to 2F and 3A to 3F. Referring to the time charts in FIGS. 2A to 2F and 3A to 3F, FIGS. 2A and 3A show the sensor output including the drift, FIGS. 2B and 3B show the amplifier output after the automatic correction, FIGS. 2C and 3C show the output of the comparator C1, FIGS. 2D and 3D show the output of the timer T1, FIGS. 2E and 3E show the output of the comparator C2, and FIGS. 2F and 3F show the operating period for automatic correction for the negative drift. Referring to FIGS. 2A to 2F, the automatic correction is shown for the sensor output upon increasing the drift. Referring to FIGS. 3A to 3F, the automatic correction is shown for the sensor output upon decreasing the drift.

Referring to FIGS. 2A to 2F, the sensor output starts to increase from the zero level (timing to), and reaches a point a1 of an output Y (timing ta1). Then, the increasing direction of the sensor output is detected by the comparator C2, and the output of the comparator C2 becomes the high level (5V) as shown in FIG. 2E. The state is held. The output Y corresponds to the second comparative voltage Vr2 of the comparator C2, which is set to the higher value than the expected maximum drift amount in the positive direction. If the zero level of the sensor output increases due to the generation of the drifts, the comparator C2 detects the increasing direction of the sensor output from the zero level correctly in accordance with the pressure increase.

Next, the sensor output further increases, and changes to decrease over the peak. Then, the output reaches a point b1 of an output X corresponding to the first comparative voltage Vr1 of the comparator C1 (timing tb1) and the output of the comparator C1 shown in FIG. 2C is inverted to the high level from the low level. As shown in FIG. 2D, the timer T1 outputs the one-shot pulse. When the timer T1 outputs the one-shot pulse (with the pulse width t1), the interval between the drain and the source of the FET Q1 is conductive and the input of the amplifier A1 is reset. Consequently, as shown in FIG. 2B, the amplifier output falls to zero at the point b1 and the zero-point level of the amplifier output is kept to be constant irrespective of the presence or absence of the drift of the sensor output. As shown in FIG. 2E, the output of the comparator C2 returns to the low level from the high level and the holding state of the comparator C2 is reset. The output of the comparator C1 is also at the low level.

After that, the sensor output further falls from the point b1 and the one-shot pulse from the timer T1 becomes the zero-point level. Then, the input enters the negative area (timing td1). As shown in FIG. 2F, the amplifier A2 automatically corrects the negative drift. A reference symbol c1 denotes the minimum point just before the sensor output starts increasing. In this case, when the amplifier output changes to increase from the minimum point c1, the operation stops (timing tc1). After that, e.g., timings ta2, tb2, td2, tc2 to tan, tbn, tdn, and tcn, the operation is similar. Referring to FIGS. 2A to 2F, when the drift increases, the minimum value just before the previous cycle is subtracted and is outputted. When the drift does not exist or when the drift decreases as shown in FIGS. 3A to 3F, the operation is similar.

When the charge signal converting amplifier is connected to the charge generating sensor and the charge signal is converted into the voltage signal, it is inevitable to prevent the drift at the zero point due to the charge leakages in the signal transmitting system or the temperature change. However, since the positive and negative offsets are suppressed by the automatic correcting circuit 3, a low price structure is realized with the simple circuit structure and the small number of parts, and the calculating load is reduced when processing the measurement signal.

Further, even in the case of continuous repetitions of the rapid pressure increases and decreases, typically for example, the engine cylinder combustion pressure, it is possible to correct the offset of the signal levels stored every cycle due to the charge leakages generated by rapid in-flows and out-flows of the charges in proportion to the pressure fluctuation, and to reduce the output error due to the temperature change. Accordingly, the combustion can be precisely analyzed and the optimum control of the combustion improves fuel consumption and reduces exhaust emissions.

In this case, in the initial state where the circuit power supply of the charge signal converting amplifier 1 is turned on, or where upon re-starting the charge signal converting amplifier 1 after an engine stall, a large charge remains on the input side of the amplifier A1. Further, the actual drift amount due to the temperature increase during the operation is over the expected maximum drift amount. In these cases, there is a danger that the input of the amplifier 1 of the signal converting circuit 2 does not reduce to the operating level of the automatic correcting circuit 3.

Therefore, in this case, the input side of the amplifier A1 is reset and initialized by using the external reset signal. However, the FET Q1 is forcebly switched on and is automatically reset when the output of the timer T1 and the output of the amplifier A2 are not normally outputted, by adding, to the automatic correcting circuit 3, the abnormal monitoring function like a watch dog timer, which monitors both outputs without using the external reset signal.

Figure 4:
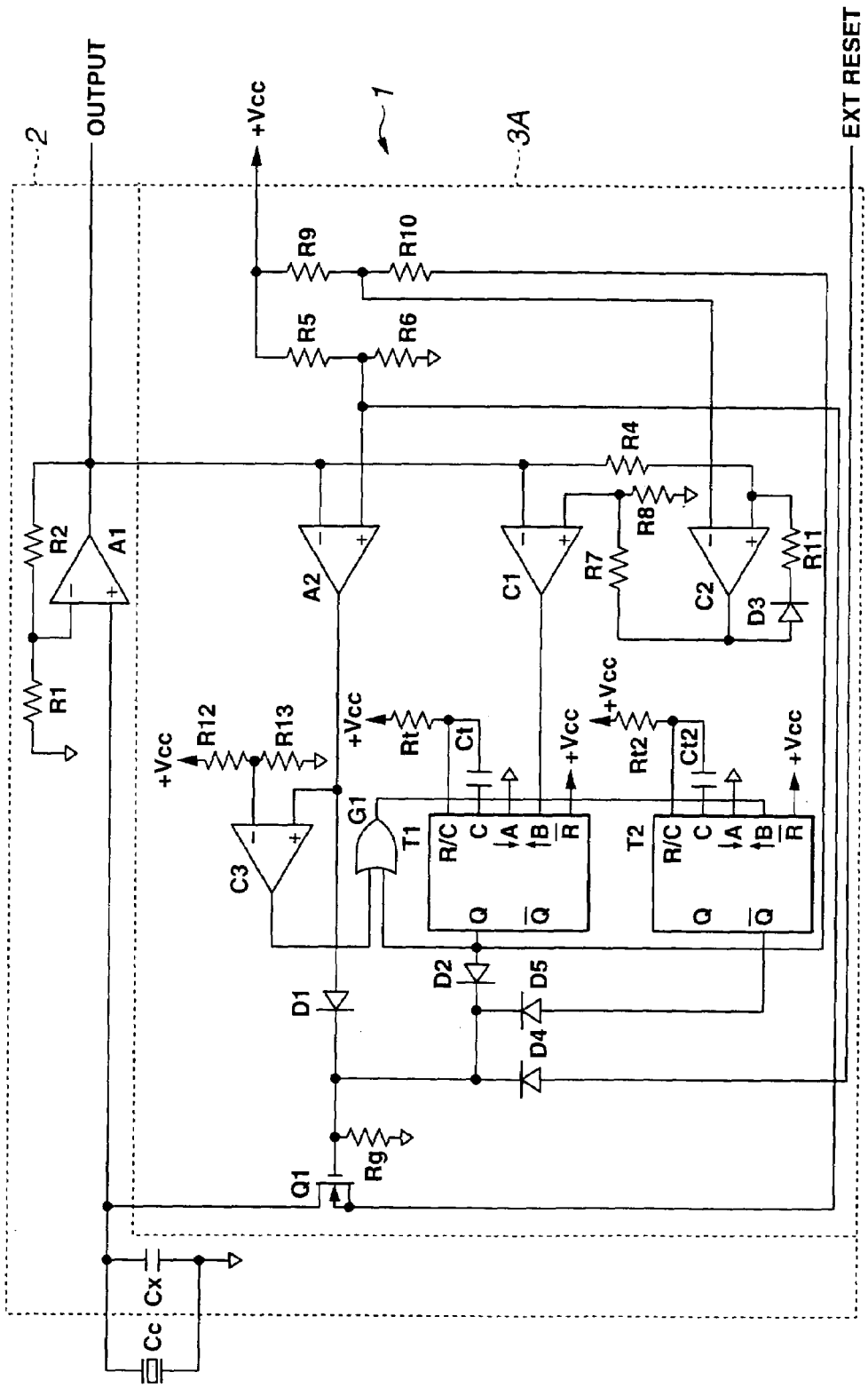
FIG. 4 is the circuit diagram showing the charge signal converting amplifier additionally having an abnormal monitoring function.

Referring to FIG. 4, the automatic correcting circuit 3A additionally having the abnormal monitoring function comprises a timer T2 which is continuously re-triggered by the output of the amplifier A2 or the output of the timer T1 in the normal mode. That is, the output terminal of the amplifier A2 is connected to the gate of the FET Q1 via the diode D1, and further is connected to one input terminal of an OR gate G1 via a comparator C3. The comparator C3 adjusts the voltage level to a logical level of the latter-stage OR gate G1, compares the output of the amplifier A2 with the reference voltage which is obtained by dividing the circuit voltage Vcc by resistors R12 and R13, and converts the output of the amplifier A2 into the logical level.

The output Q terminal of the timer T1 is connected to another input terminal of the OR gate G1, and an output terminal of the OR gate G1 is connected to a trigger input (input B) terminal of the timer T2. The timer T2 is a re-trigger type one which outputs the one-shot pulse with the pulse width which is determined in dependency on an external resistor Rt2 and a capacitor Ct2. The inverting output Q terminal of the timer T2 is connected to the gate of the FET Q1 via a diode D5.

In the automatic correcting circuit 3A having the abnormal monitoring function, when the automatic correction normally functions, the timer T2 continuously re-triggers from the OR gate G1 based on the output of the amplifier A2 or the output of the timer T1. In the timer T2, the pulse width of the one-shot pulse is set to be longer than the length of one cycle upon increasing and decreasing the sensor output. Based on the re-trigger, the inverting output Q always maintains the low level without any influences on the original operation of the charge signal converting amplifier 1.

When the abnormal state is caused, for example, when both the output of the amplifier A2 and the output of the timer T1 are in the state at the zero-point level, the timer T2 is not triggered by the OR gate G1. Further, the inverting output Q of the timer T2 is at the high level, thereby switching on the FET Q1. As a consequence, the charges on the input side of the amplifier A1 are discharged. After that, the automatic correction activates by using the automatic reset operation on the input side of the amplifier A1 with the timer T2, and the timer T2 is triggered. Then, the inverting output Q is at the low level, and the automatic correcting circuit 3A returns to the normal operation.

Therefore, the automatic correcting circuit 3A operates without failure by automatically resetting the input side of the amplifier A1, when a large amount of charges remains on the input side of the amplifier A1 due to any causes in the initial state after turning on the circuit power supply of the charge signal converting amplifier 1 and when the actual drift amount due to the temperature increase during the operation is over the expected maximum drift amount.

In the above-mentioned circuits, the correction of the negative drift by the output of the amplifier A2 and the correction of the positive drift by the output of the timer T1 are executed by driving the one common switch element (FET Q1). The driving condition of the switch element by the output of the amplifier A2 and the driving condition of the switch element by the output of the timer T1 do not always have the same optimum condition.

Figure 5:
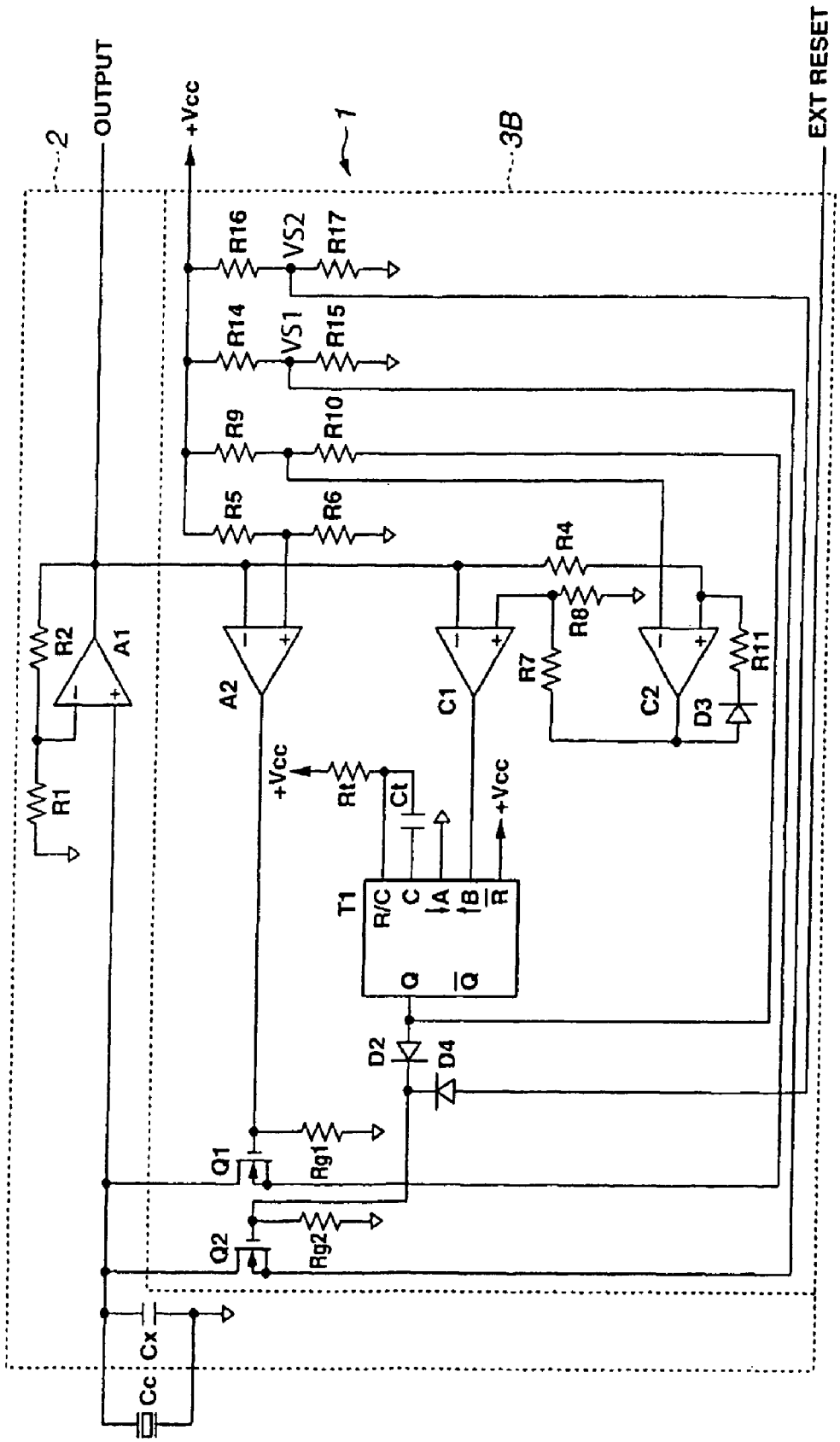
FIG. 5 is the circuit diagram showing the charge signal converting amplifier having a switch element for correcting a negative drift and the switch element for correcting a positive drift, independently.

Referring to FIG. 5, the switch element for correcting the negative drift and the switch element for correcting the positive drift may be provided independently. The automatic correcting circuit 3B shown in FIG. 5 uses an FET Q2 (N-channel MOS type) as well as the FET Q1 for the automatic correcting circuit 3 shown in FIG. 1. In the automatic correcting circuit 3B, the output terminal of the amplifier A2 is connected to the gate of the FET Q1, and the output Q terminal of the timer T1 is connected to the gate of the FET Q2 via the diode D2.

In the FET Q1, a gate resistor Rg1 for obtaining the optimum gate voltage suitable to the output of the amplifier A2 is connected to the gate of the FET Q1, and the source of the FET Q1 is connected to a potential point Vs1 which divides the circuit voltage Vcc by the resistors R14 and R15. In the other FET Q2, a gate resistor Rg2 for obtaining the optimum gate voltage suitable to the output of the timer T1 is connected to the gate of FET Q2, and the source of the FET Q2 is connected to a potential point Vs2 which divides the circuit voltage Vcc by resistors R16 and R17. The external reset signal is inputted to the gate of the FET Q2 via the diode D4.

The basic operation in the circuits shown in FIG. 5 is mentioned above. However, the potential point Vs1 for determining the source potential, when the FET Q1 is conductive, suppresses the output of the amplifier A2 to the low level upon correcting the negative drift with the amplifier A2, and it is set to the value which can reduce as much as possible the compression upon rising the output of the amplifier A1 due to the offset of the charges in the capacitance Cdg between the drain and the gate of the FET Q1 with the input charges. In order to set the output of the amplifier A2 to the lower level as much as possible, the potential point Vs1 may be set to a higher voltage (e.g., +6 mV). However, if the potential point Vs1 is set to an excessively higher level, a leak from a parasite diode of the FET Q1 occurs and therefore it is appropriately set the potential point Vs1 in accordance with the application.

The potential point Vs2 for determining the source potential when the FET Q2 is conductive may be set to the same level as the reference voltage Vref (e.g., +2 mV) of the amplifier A2 without the automatic correction of the amplifier A2 for the output of the amplifier A1. That is, when the positive drift is corrected by the comparators C1 and C2 and the timer T1, the FET Q2 conducts during the one-shot pulse from the timer T1. When the one-shot pulse does not exist, the charges in the capacitance Cdg between the drain and the gate of the FET Q2 are discharged to the input side of the amplifier A1. Therefore the voltage on the input side of the amplifier A1 is the same as that of the potential point Vs2, but then is reduced. As a result of the voltage reduction, if the output of the amplifier A1 is higher than the reference voltage Vref of the amplifier A2, the output of the amplifier A1 is directly used. If the output of the amplifier A1 is lower than the reference voltage Vref, the automatic correction is executed by the amplifier A2.

Figure 6:
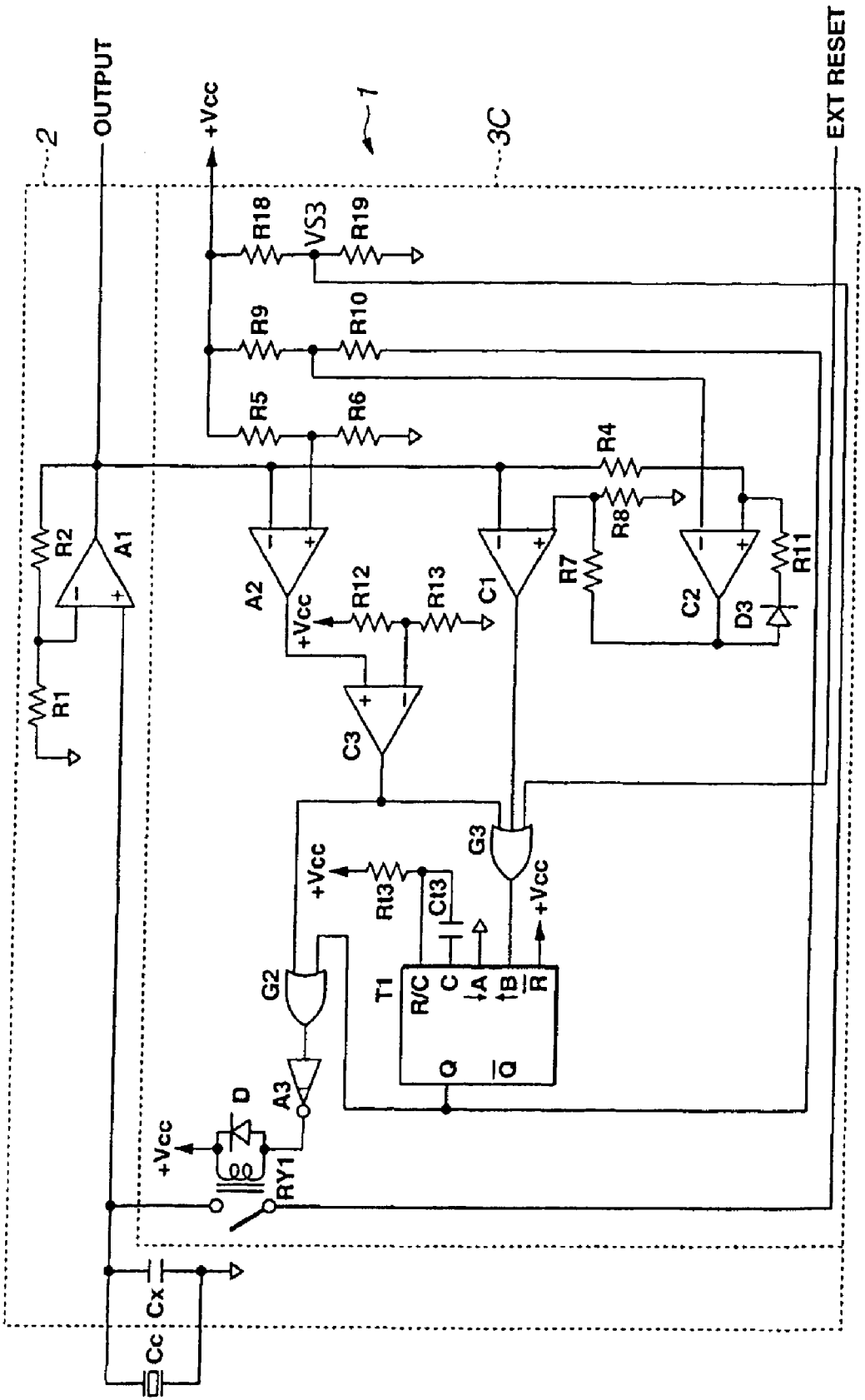
FIG. 6 is the circuit diagram showing the charge signal converting amplifier having an automatic correcting circuit using a mechanical switch.

Switch elements for correcting the positive and negative drifts (FETs Q1 and Q2) can be replaced with mechanical switches. FIG. 6 shows the circuit diagram showing the charge signal converting amplifier 1 having the automatic correcting circuit 3C comprising the mechanical switch. The automatic correcting circuit 3C shown in FIG. 6 comprises a relay as the mechanical switch, in place of the FET as the semiconductor switch. In this case, the automatic correcting circuit 3 shown in FIG. 1 is changed with the circuit structure in consideration of the response of the relay.

That is, the capacitor Cx for converting the voltage and the non-inverting input terminal of the amplifier A1 are connected to a potential point Vs3 which divides the circuit voltage Vcc by resistors R18 and R19 via the contact (normally opened contact) of a relay RY1, and a driver amplifier A3 drives a relay coil of the relay RY1 having a flywheel diode D connected in parallel therewith.

The driver amplifier A3 is driven by an OR gate G2 which receives the output of the comparator C3 and the output Q of the timer T1. The comparator C3 converts the output of the amplifier A2 into the logical level. Further, a trigger input (input B) terminal of the timer T1 is connected to an OR gate G3 whose input terminals are connected to the output of the comparator C3, the output of the comparator C1 and the external reset signal.

The circuits in FIG. 6 using the relay RY1 have the same basic operation as mentioned above. The pulse width of the one-shot pulse determined by a resistor Rt3 and a capacitor Ct3 externally attached to the timer T1 is the time (e.g., to several ms) for which the relay RY1 securely operates, and the relay RY1 is operated without fail by triggering the timer T1 by any of the output of the amplifier A2 (output of the comparator C3), the output of the comparator C1, and the external reset signal.

The capacitance Cdg between the drain and the gate upon using the FET does not influence a potential point Vs3 which determines the voltage on the input side of the amplifier A1 when the contact of the relay RY1 is closed. Therefore, the reference voltage Vref is set to a value obtained by dividing the reference voltage Vref by the amplification degree (R1+R2)/R1 of the amplifier A1 so that the output of the amplifier A1 is approximately the same as the reference voltage Vref (e.g., +2 mV) of the amplifier A2 without the automatic correction of the amplifier A2 (actually, it is set in consideration of the offset values of the amplifiers A1 and A2).

Figure 7:
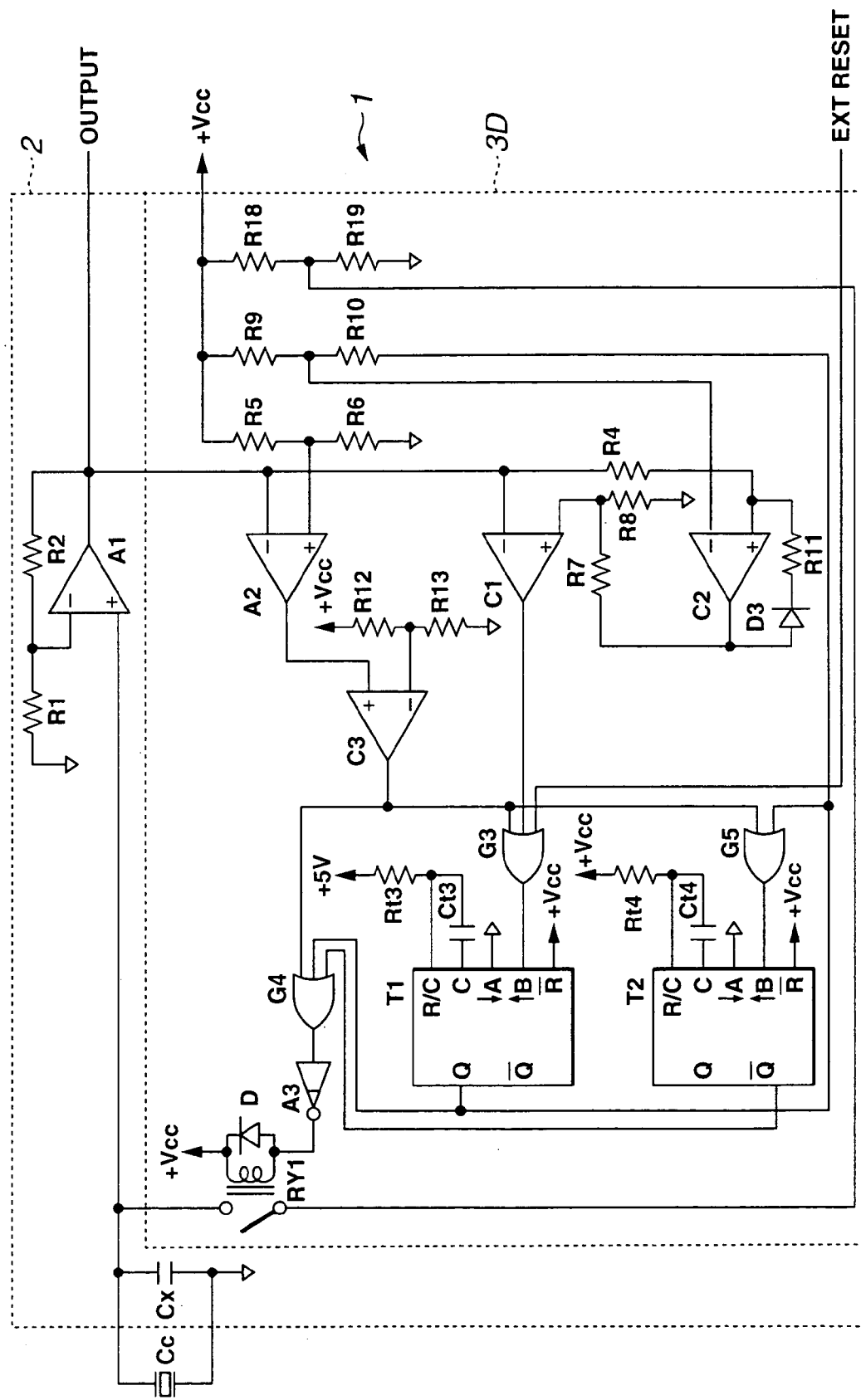
FIG. 7 is the circuit diagram additionally having the abnormal monitoring function in the charge signal converting amplifier shown in FIG. 6.
Figure 8:
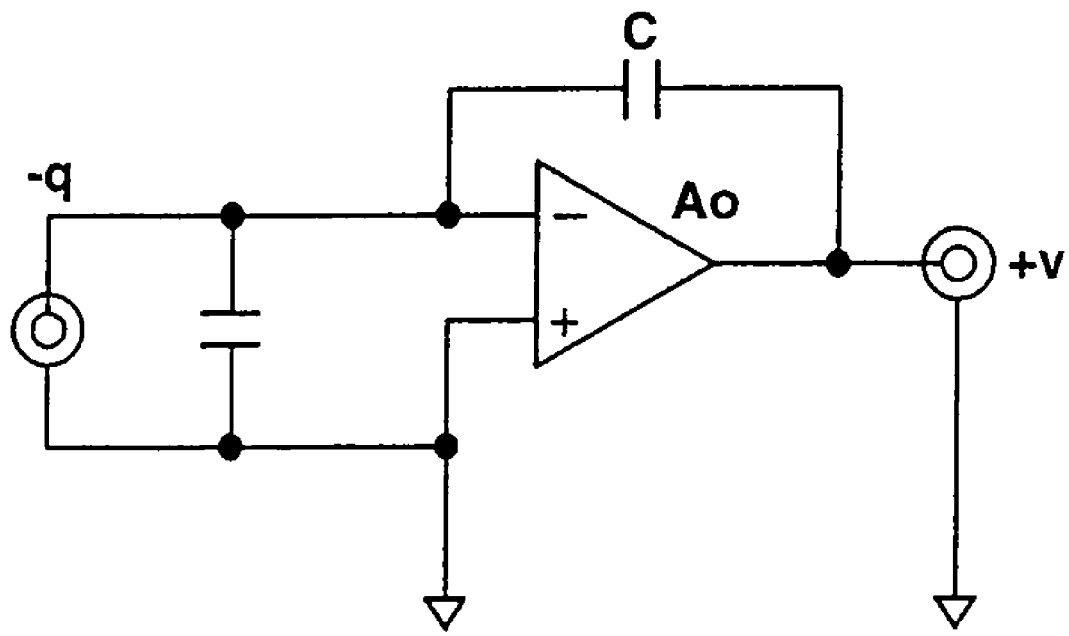
FIG. 8 is the circuit diagram showing the charge amplifier according to a conventional prior art.
Figure 9:
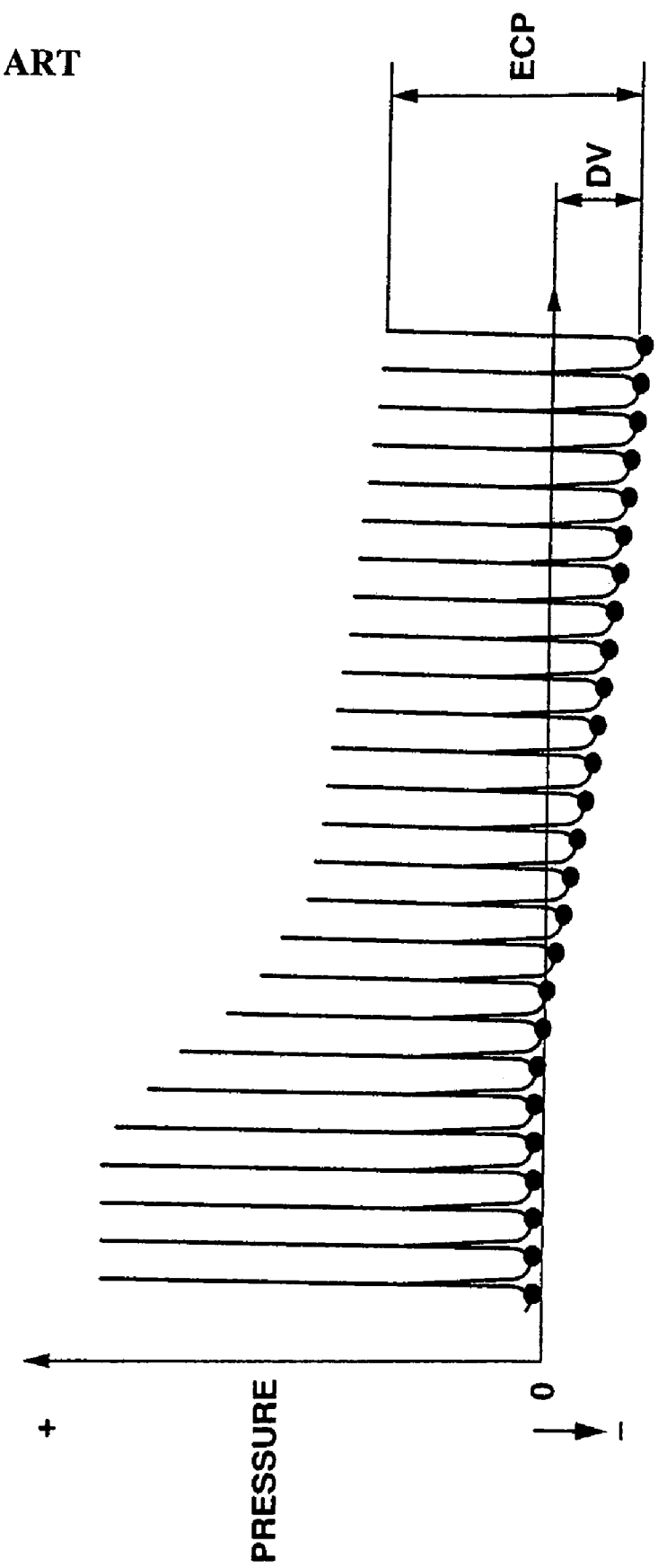
FIG. 9 is an explanatory diagram showing the offset of a signal level due to a charge leakage according to the conventional prior art.

In this case, the abnormal monitoring function may be arranged for the output of the amplifier A2 and the output of the timer T1 in the automatic correcting circuit 3C, as mentioned above. That is, referring to FIG. 7, an automatic correcting circuit 3D has the abnormal monitoring function using the timer T2 in addition to the circuits shown in FIG. 6. In the automatic correcting circuit 3D, an OR gate G4 for driving the driver amplifier A3 receives the output of the comparator C3 for converting the output of the amplifier A2 into the logical level, the output of the timer T1, and an inverting output Q of the timer T2.

The output of the comparator C3 and the output of the timer T1 are inputted to a trigger input (input B) terminal of the timer T2 via an OR gate G5. An external resistor Rt4 and a capacitor Ct4 are set so that the pulse width of the inverting output Q is slightly longer than the length of one cycle upon increasing and reducing the sensor output. Thus, as long as the re-trigger is set, the inverting output Q is always kept to the low level.

Unadvantageously, the relay RY1 as the mechanical switch is used as the switch element for correcting the positive and negative drifts in view of the response as compared with the semiconductor switch element. However, advantageously, the circuit setting is easy without any influences of charges stored in the semiconductor switch element.

As mentioned above, the charge signal converting amplifier of the present invention prevents the fluctuation of the zero-point level due to the negative drift caused by the charge leakages and the positive drift by the temperature change, and the calculating load necessary for the signal processing may be reduced.

Having described the preferred embodiments of the invention referring to the accompanying drawings, it should be understood that the present invention is not limited to those precise embodiments and various changes and modifications thereof could be made by one skilled in the art without departing from the spirit or scope of the present invention as defined in the appended claims.

What is claimed is:

1. A charge signal converting amplifier, comprising:
a signal converting circuit operable to convert a sensor charge signal proportional to a mechanical load into a voltage signal and operable to output said voltage signal, the signal converting circuit comprising:
a voltage converting capacitor:
a sensor connected to the voltage converting capacitor; and
an amplifier having an input terminal configured to receive a voltage from a charge stored in the voltage converting capacitor;
an automatic correcting circuit responsive to said voltage signal operable to correct automatically drift in a positive direction, due to a temperature change, and drift in a negative direction, due to a charge leakage, generated in an input signal transmitting system, the automatic correcting circuit comprising a switching element operable to conduct a signal line between the amplifier and the voltage converting capacitor to a zero point;
the automatic correcting circuit being further operable to set an output level of said signal converting circuit to a same level at a start time and an end time of cycles of said mechanical load using the switching element.

2. The charge signal converting amplifier according to claim 1, wherein said automatic correcting circuit discharges said charge storage on an input side of said signal converting circuit.

3. The charge signal converting amplifier according to claim 2, wherein said automatic correcting circuit is further operable to correct said drift in said positive direction when said output voltage signal t falls from a peak value and is at said same level or a lower level preset in consideration of a maximum drift amount in said positive direction.

4. The charge signal converting amplifier according to claim 2, wherein said automatic correcting circuit is further operable to correct said drift in said negative direction when said output voltage signal is equal to or less than a reference level for determining a zero-point.

5. A charge signal converting amplifier comprising,
a signal converting circuit operable to convert a sensor charge signal proportional to a mechanical load into a voltage signal and operable to output said voltage signal, the signal converting circuit comprising a sensor connected to an input capacitor which is connected to an amplifier;
an automatic correcting circuit responsive to said voltage signal operable to automatically correct drift in a positive direction due to a temperature change, and drift in a negative direction, due to a charge leakage, generated in an input signal transmitting system the input signal transmitting system comprising at least one of a cable between the sensor and the input capacitor, and a signal line between the input capacitor and the amplifier; and
the automatic correcting circuit being further operable to set an output level of said signal converting circuit to a same level at a start time and an end time of cycles of said mechanical load.

6. A charge signal converting amplifier comprising:
a signal converting circuit operable to convert a sensor charge signal proportional to a mechanical load into a voltage signal and operable to output the voltage signal, the signal converting circuit comprising:
a voltage converting capacitor; and
a first amplifier having an input terminal configured to receive a voltage from a charge stored in the voltage converting capacitor;
an automatic correcting circuit responsive to the voltage signal to automatically correct drift in a positive direction due to a temperature change, and drift in a negative direction due to a charge leakage generated in an input signal transmission system, and further operable to set an output level of the signal converting circuit to a zero point at a start time and an end time of cycles of the mechanical load, the automatic correcting circuit comprising:
- a second amplifier operable to detect the negative drift from a sensor output;
- a plurality of comparators operable to correct a positive drift; and
- a switching element configured to conduct a signal line between the second amplifier and the voltage converting capacitor to the zero point;

wherein the automatic correcting circuit sets the output level of the signal converting circuit to the zero point using the switching element.

7. The charge signal amplifier according to claim 1, wherein the automatic correcting circuit further comprises:
- an abnormal monitoring circuit having a timer which is continuously re-triggered by the output of the amplifier or the output of the timer T1 in the normal mode.

8. The charge signal amplifier according to claim 1, wherein the switching element comprises:
- a first switching element for correcting a negative drift; and
- a second switching element for correcting a positive drift, wherein the first and second switching elements operate independently of each other.

* * * * *